(12) United States Patent
Fryer

(10) Patent No.: US 10,198,024 B2
(45) Date of Patent: Feb. 5, 2019

(54) ERGONOMIC GEAR SHIFT GRIP ADJUSTER

(71) Applicant: David S. Fryer, Pleasant Valley, NY (US)

(72) Inventor: David S. Fryer, Pleasant Valley, NY (US)

( * ) Notice: Subject to any disclaimer, the term of this patent is extended or adjusted under 35 U.S.C. 154(b) by 0 days.

(21) Appl. No.: 15/394,210

(22) Filed: Dec. 29, 2016

(65) Prior Publication Data

US 2018/0188766 A1 Jul. 5, 2018

(51) Int. Cl.
| | |
|---|---|
| *G05G 1/04* | (2006.01) |
| *F16H 59/02* | (2006.01) |
| *G05G 1/54* | (2008.04) |
| *B60K 20/04* | (2006.01) |
| *B60K 26/00* | (2006.01) |

(52) U.S. Cl.
CPC ............. *G05G 1/54* (2013.01); *B60K 20/04* (2013.01); *B60K 26/00* (2013.01); *F16H 59/0278* (2013.01)

(58) Field of Classification Search
CPC .. G05G 1/06; G05G 1/10; G05G 1/12; G05G 1/54; B60K 20/02; B60K 21/125; B60K 20/04; B60K 26/00; F16H 59/0278; F16H 2059/026; B62K 21/125
See application file for complete search history.

(56) References Cited

U.S. PATENT DOCUMENTS

| | | | |
|---|---|---|---|
| 1,155,916 A | 10/1915 | Grout | |
| 1,232,449 A | 7/1917 | Mellin | |
| 1,256,244 A | 2/1918 | Mellin | |
| 1,262,425 A | 4/1918 | Young | |
| 1,283,852 A | 11/1918 | Mellin | |
| 1,285,351 A | 11/1918 | Parsons et al. | |
| 1,301,475 A | 4/1919 | Mellin | |

(Continued)

FOREIGN PATENT DOCUMENTS

| | | | |
|---|---|---|---|
| DE | 29616622 U1 * | 11/1996 | ........... B62K 21/125 |
| GB | 2524939 | 10/2015 | |

OTHER PUBLICATIONS

International Search Report and Written Opinion dated Jun. 21, 2018 for International Application No. PCT/US2017/069005, filed Dec. 29, 2017.

*Primary Examiner* — Adam D Rogers
(74) *Attorney, Agent, or Firm* — Cooley LLP; N W Poulsen; L A McAnelly

(57) ABSTRACT

An ergonomic adapter for a transmission tower for a motor vehicle, such as a tractor-trailer is disclosed. The adapter includes a tower mounting bracket that is removably coupled to the tower of the transmission and can be positioned at a selected position along the height of the transmission tower and at a selected angular position about an axis of the tower. The adapter also includes an extension bracket rotatably coupled with the tower mounting bracket about an extension axis. The extension bracket can be fixed to the tower mounting bracket at a selected angular position about the extension axis. The adapter also includes a handle rotatably coupled to the extension bracket about a handle axis. The handle can be fixed to the handle at a selected angular position about the handle axis. The adapter allows a driver to adapt the transmission tower to the driver's body to provide improved operation of the vehicle.

10 Claims, 11 Drawing Sheets

(56) References Cited

U.S. PATENT DOCUMENTS

| | | |
|---|---|---|
| 1,409,447 A | 3/1922 | Hughes |
| 1,545,462 A | 7/1925 | Watson et al. |
| 2,108,745 A | 2/1938 | Dodd |
| 2,185,024 A | 12/1939 | Eddy |
| 2,561,632 A | 7/1951 | Nejezchleb |
| 2,630,342 A * | 3/1953 | Gilmont ............ B01L 9/50 |
| | | 403/53 |
| D214,786 S | 7/1969 | Meiluta |
| 3,456,525 A | 7/1969 | Oldham |
| D215,276 S | 9/1969 | Spargo |
| 4,197,764 A | 4/1980 | Auernhammer |
| 4,515,029 A | 5/1985 | Reynolds et al. |
| 4,535,648 A | 8/1985 | Stelzer et al. |
| 4,624,206 A | 11/1986 | Frye et al. |
| 4,811,921 A | 3/1989 | Whitaker et al. |
| 4,916,969 A | 4/1990 | Henning |
| 5,040,432 A | 8/1991 | Carlstedt |
| 5,094,124 A * | 3/1992 | Stonehouse ........ B62K 21/125 |
| | | 74/551.1 |
| 5,131,116 A | 7/1992 | Bowdler |
| 5,133,568 A * | 7/1992 | Balterman ............ B62H 5/14 |
| | | 224/420 |
| 5,145,210 A * | 9/1992 | Lennon ............ B62K 21/125 |
| | | 280/261 |
| 5,669,322 A | 9/1997 | Huzjak |
| 6,029,535 A | 2/2000 | Kenny et al. |
| 6,058,797 A | 5/2000 | Konig et al. |
| 6,186,027 B1 * | 2/2001 | Nielsen ............... B62K 21/18 |
| | | 403/365 |
| 6,202,504 B1 | 3/2001 | Burkle |
| 6,234,501 B1 | 5/2001 | Chen |
| 6,318,209 B1 | 11/2001 | Park |
| 6,662,680 B2 * | 12/2003 | Rocket ............ B62K 21/125 |
| | | 74/551.1 |
| 6,736,357 B2 * | 5/2004 | Venn ............... F16H 59/0278 |
| | | 248/118 |
| 7,000,497 B1 | 2/2006 | Campbell et al. |
| 8,065,774 B2 | 11/2011 | Schiesz et al. |
| 8,677,851 B2 | 3/2014 | Vermeersch |
| 8,984,987 B2 | 3/2015 | Johnson |
| 9,352,183 B2 * | 5/2016 | Quinn ............... A63B 21/025 |
| 2002/0170144 A1 | 11/2002 | Agate, Sr. et al. |
| 2006/0107780 A1 | 5/2006 | Beiermann et al. |

* cited by examiner

ERGONOMIC GEAR SHIFT GRIP ADJUSTER

TECHNICAL FIELD

The present application is generally directed to ergonomically adjustable structures for motor vehicles and other manually-operated levers, and more particularly, to an attachable/detachable and ergonomically adjustable grip to facilitate operation of a gear shift tower of a truck, a tractor-trailer, or other heavy equipment.

COPYRIGHT NOTICE

A portion of the disclosure of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

Operation of trucks and other heavy equipment requires an operator to frequently shift gears. Modern tractor trailer transmissions typically include 18 gear settings. Control of the transmission is accomplished by moving a shift tower through positions arranged in an H-shaped pattern. A selected gear ratio is engaged when the tower is pushed or pulled into a position at an end of a leg of the H-shaped pattern. A hydraulic switch located on the tower allows the driver to select whether the positions on the H-shaped pattern correspond to low, high, or overdrive combinations.

A large number of gear selections allows a driver to operate the vehicle efficiently, to navigate inclines and declines, and to quickly decelerate or accelerate in emergency situations. To make effective use of the gear selection, an operator must be able to rapidly move the tower among the gear selections and to easily access the switch.

During normal operation on the open road a driver may shift gears hundreds of times in an hour. In heavy traffic, or in stop and go city driving, even more frequent shifting may be required. Operators often operate vehicles up to ten hours per day and upwards of 250 days per year. Thus, an operator may need to shift gears half a million times or more per year.

Shifting gears places significant, repetitive strain on muscles and tendons that control motions of the driver's wrist and elbow that can lead to injury. Operating a manual transmission requires that the driver apply force to the tower to assure that the transmission is firmly engaged in the desired gear. Moreover, gear shifting involves moving the tower through the same H-shaped pattern over and over again. Furthermore, the location and angle of the tower may not be ideal for a particular driver, given the location of the seat, the height and arm-length of the driver and the fact that the driver must also work foot pedals simultaneously with the gear shifter. As a result, drivers sometimes suffer from repetitive motion injuries to the wrist and elbow. These injuries include wrist flexor tendinopathy (golfer's elbow), which is an inflammation of the tendon of the wrist flexor muscle.

Orthopedists recommend that people who perform tasks that require the same motion repeatedly make an effort to rest the limb performing the repetitive task. For truck drivers, gear shifting is a constant activity and, unless the driver pulls off the road (which costs time and money) there is no opportunity to rest. To the extent a repetitive motion cannot be avoided, orthopedists recommend adjustment of the range of motion to reduce overuse of particular tendons.

Located near the top of the tower are switches that allow the driver to select low, high, and overdrive gear combinations and/or to select intermediate (split) gears. The switches are positioned near enough to the grip so that the driver can quickly change from low to high to overdrive while at the same time moving the tower. Operation of the switches must be done simultaneously with motion of the tower to smoothly transition between gears.

The bottom end of the tower engages the transmission located along the center-line of the truck below the floor of the cab. The distance the top of the tower must travel through the H-shaped pattern discussed above in order to engage gears depends on the design of the transmission and on the height of the tower. These dimensions are fixed for a particular truck. Moreover, trucks made by different manufacturers, and even trucks made by the same manufacturer, but with different transmissions, may have different distances through which the tower most be moved. In many cases, drivers working for companies that employ a fleet of trucks (e.g., Federal Express, United Parcel Service, etc.) may be assigned to a variety of trucks. As a result, the distance a driver must reach through to shift gears may change from trip to trip, depending on which truck he or she is assigned.

Trucks are usually provided with seat adjustments that allow the driver to position the height of the seat, the distance of the seat from the controls, and the angle of the seat. Likewise, many trucks have adjustable steering columns and fuel, brake, and clutch pedals to allow the driver to comfortably operate the vehicle. The gear shift tower lacks such ergonomic adjustments. Instead, the location of the gear shift and the distance through which the tower must be pushed or pulled is determined by the overall shape of the cab and the design of the transmission. Likewise, the angle of the tower grip with respect to the driver's wrist is fixed by the design of the vehicle and cannot be adjusted to accommodate the shape of a drivers hand or the driver's range of comfortable motion. As a result, drivers are unable to make ergonomic adjustments to the tower grip. In addition, the grip on the tower does not provide a variety of surfaces to allow the driver to vary the position of his or her wrist, elbow, and shoulder when shifting gears.

The problem of injuries and strain resulting from poor ergonomics of gear shift tower is more acute for drivers with less upper body strength, and with drivers that suffer from arthritis, osteoporosis, and loss of muscle due to aging. In the United States, the average age of truck drivers is increasing as fewer younger drivers enter the business. Also, there is an increasing number of women, who general have less upper body strength than men. Thus, there are increasing numbers of drivers with reduced upper body strength that can benefit from an adjustment that can make the gear shift tower easier to operate.

SUMMARY OF THE INVENTION

Accordingly, there is a need for a mechanism that allows a driver to customize the place where he or she holds and operates the gear shift tower of a motor vehicle. There is also a need for a mechanism that allows a driver to engage the gear shift tower with a variety of hand position so that driver can vary the angle of his wrist and shoulder while operating the vehicle to reduce the repeated strain on one particular set of muscles and tendons. There is also a need for a mechanism that allows a driver to conveniently customize the position of his engagement with a gear shift tower on any vehicle so that drivers that must operate fleet vehicles can improve the ergonomic operation of the vehicle without having to permanently alter the vehicle itself.

According to one embodiment there is provided an ergonomic adapter for a transmission tower comprising: a tower mounting bracket, the bracket removably coupled to a tower of the transmission and adapted to be positioned at a selected position along the height of the transmission tower and at a selected angular position about an axis of the tower; an extension bracket rotatably coupled with the tower mounting bracket about an extension axis and adapted to be fixed to the tower mounting bracket at a selected angular position about the extension axis; and a handle rotatably coupled to the extension bracket about a handle axis and adapted to be fixed to the handle at a selected angular position about the handle axis.

According to a further aspect of the invention, the handle of the adapter further comprises a plurality of gripping surfaces, wherein each gripping surface is sized to accommodate an operator's hand. According to a further aspect the gripping surfaces comprise two parallel portions, and the handle further comprising a safety bar where the safety bar extends between the parallel portions. According to yet another aspect the handle further comprises a mounting plate connected with at least a first one of the gripping surfaces, wherein the gripping surfaces and the plate form a loop. According to this aspect, a safety bar extends from a second one of the gripping surfaces to the plate. According to a still further aspect of the invention, the handle comprises a single, cylindrical gripping surface.

According to another aspect of the invention, the adapter includes a bushing positioned between an interior surface of the mounting bracket and an exterior surface of the tower. According to yet another aspect of the invention the exterior surface of the tower is cylindrical.

BRIEF DESCRIPTION OF THE DRAWINGS

The invention is illustrated in the figures of the accompanying drawings, which are meant to be exemplary and not limiting, and in which like references are intended to refer to like or corresponding parts.

DETAILED DESCRIPTION

An attachable/detachable and ergonomically adjustable grip for the gear shift tower of a motor vehicle or other manual lever assembly and the method of making such an adjustable grip according to embodiments of the present invention are provided.

Figure 1:
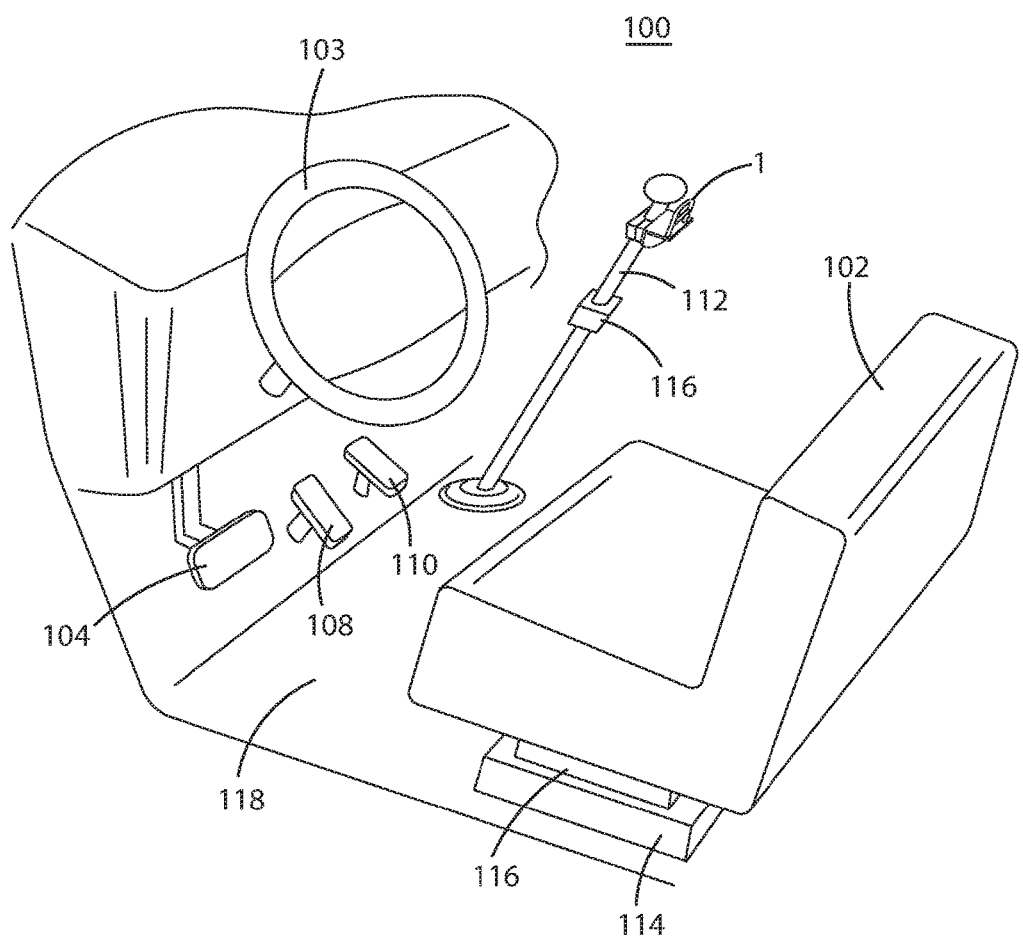
FIG. 1 shows the interior of a cab of a vehicle equipped with a device according to an embodiment of the present invention.

FIG. 1 depicts the interior of the cab of a motor vehicle 100. The vehicle may be a tractor-trailer, a delivery truck, an automobile, a piece of heavy equipment (e.g., front loader), or the like. A driver's seat 102 is positioned behind the steering wheel 103. The seat may include a track engagement 114 with the floor 118 of the vehicle cab. The seat may also include a height adjustment 116. The track 114 and height adjustment 116 allow the driver to comfortably position himself with respect to control mechanisms, including the steering wheel 103, clutch pedal 104, brake pedal 106, and throttle 108. Extending up from the floor 118 is the gear shift tower 112. Mounted on the gear shift tower 112 is an adjustable grip 1 according to an embodiment of the invention. Also mounted on the tower 112 is a switch 116 that allows the driver to select low, high, and overdrive gear settings.

Figure 2:
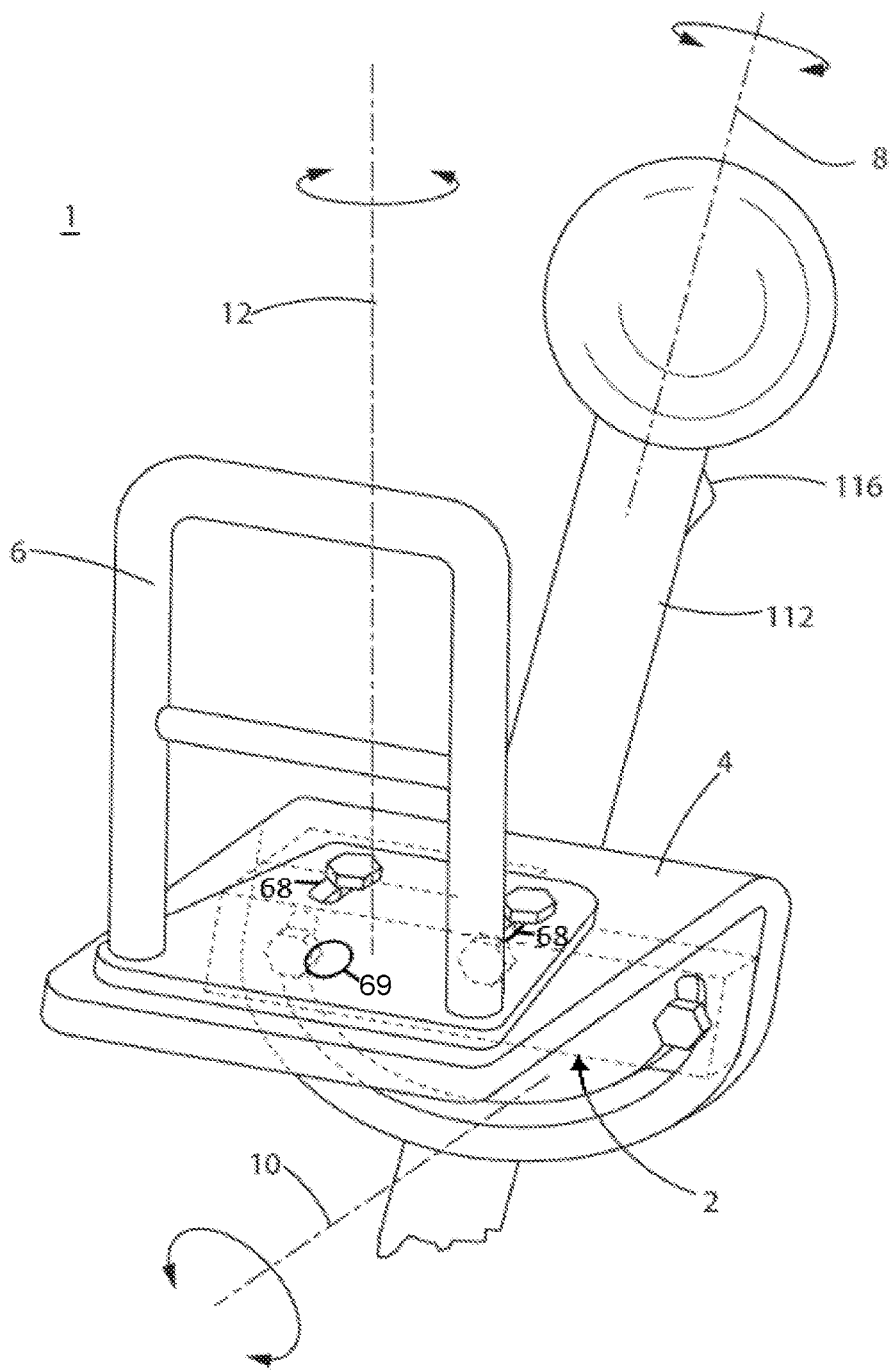
FIG. 2 shows a view of an embodiment of the present invention attached to a shift tower.

FIG. 2 is a detailed view of the adjustable grip 1 shown in FIG. 1 according to one embodiment of the invention. The grip 1 is fixed to the tower 112. Switch 116 is mounted near the top of the tower 112. A clamp 2 mounts the grip to the tower 112. A extension bracket 4 is connected with the clamp 2. According to one embodiment, the bracket 4 has two surfaces arranged at a right angle to one another. Handle 6 is connected with the extension bracket 4.

According to one embodiment, the tower 112 has a round cross section. The engagement between the clamp 2 and tower 112 can be positioned about the tower axis 8 along the height of the tower 112. As will be explained more fully below, the engagement between the clamp 2 and extension bracket 4 can be adjusted about an extension axis 10. Likewise, the engagement between the handle 6 and bracket 4 can be adjusted about a handle axis 12. The height of the adapter 1 on the tower 112, as well as the position of the handle 6 with respect to the tower 112 is adjusted so that the operator can comfortably move the tower 112 through its range of operation while also allowing the operator to conveniently reach the switch 116.

Figure 3A:
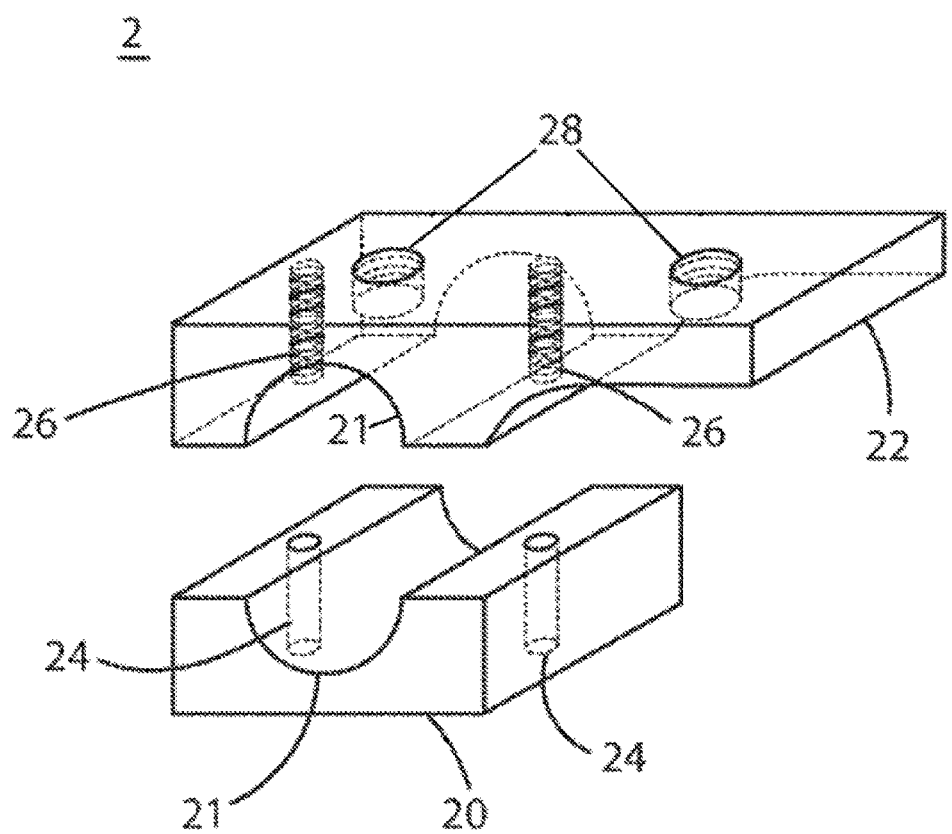
FIG. 3A shows an engagement clamp of the embodiment shown in FIG. 2
Figure 4A:
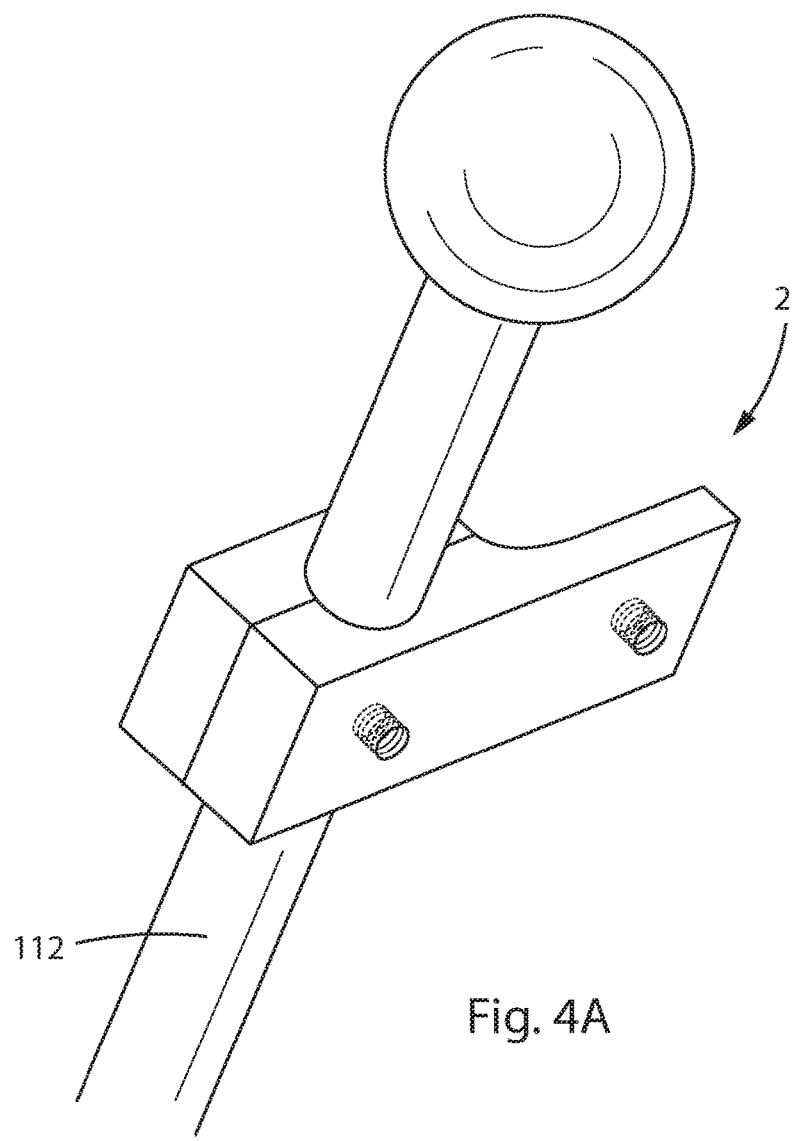
FIG. 4A shows the engagement clamp of FIG. 3A connected with a gear shift tower.

FIG. 3A shows a detailed view of a clamp 2 according to an embodiment of the invention. The clamp is formed from an engagement portion 22 and an opposing portion 20. Through holes 24 in the opposing portion 20 allow mounting bolts (not shown) to extend through the opposing portion. The bolts engage with threaded holes 26 in the engagement portion 22. Arcuate surfaces 21 on the opposing portion 20 and engagement portion 22 are shaped to closely match the surface of the tower 112 so that when the bolts pull the opposing portion 20 and the engagement portion 22 together the clamp 2 is fixed at a selected position on the tower 112. FIG. 4 shows a view of clamp 2 connected with tower 112. When the device is installed, the opposing portion 20 and engagement portion 22 are tightened against the tower 112 at a height selected along the tower to best accommodate the driver. Also, the clamp is positioned at a position about the tower axis 8 (shown in FIG. 2) so that the handle 6 will be conveniently positioned for the driver when the device 1 is fully assembled. Engaging portion 22 includes two threaded holes 28 to connect with the bracket 4.

Figure 4B:
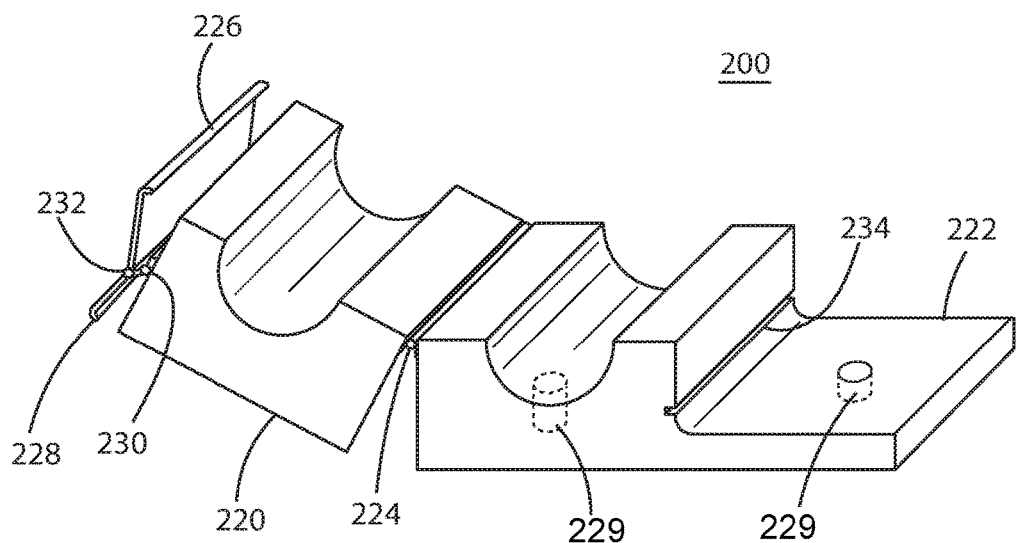
FIG. 4B shows an alternative embodiment of an engagement clamp in an open position.
Figure 4C:
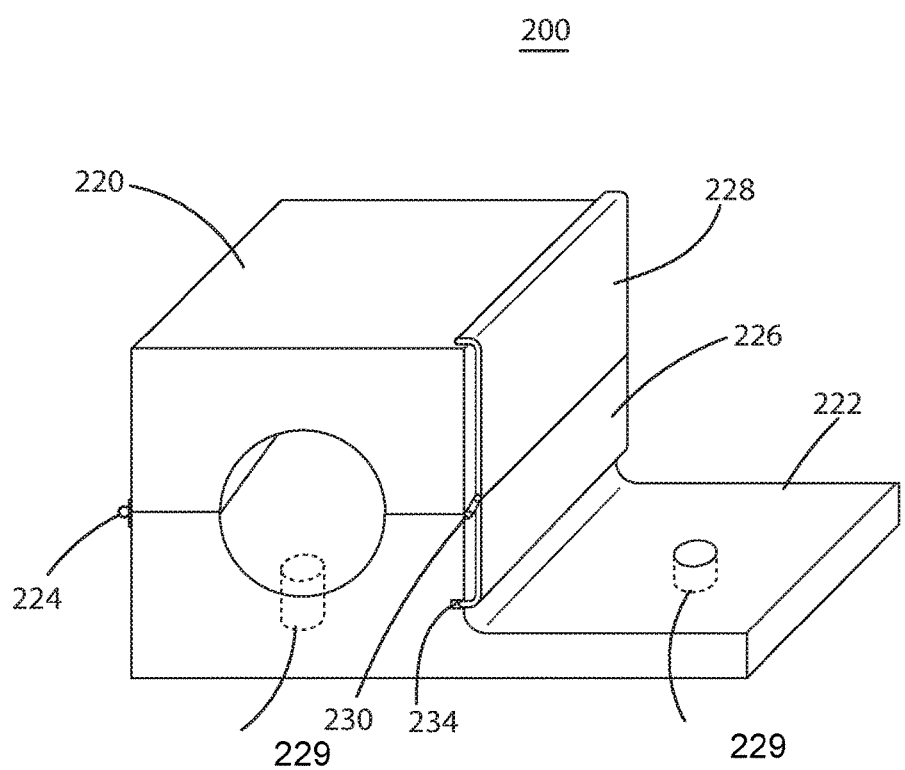
FIG. 4C shows the embodiment of the engagement clamp of FIG. 4B in the closed position.

According to another aspect of the invention, clamp 2 is connected with tower 112 by way of a latch mechanism such as an over-center latch. FIGS. 4B and 4C show a view of such an embodiment. FIG. 4B shows a clamp 200 formed from an engagement portion 222 (including holes 229 defined therein) and an opposing portion 220 connected by clamp hinge 224. Latch 228 is connected to the opposing portion 220 by a latch hinge 230. A hasp 226 is connected to the latch 228 by a hasp hinge 232. A receiving notch 234 is formed in the engagement portion 222 on a side opposite the side connected with hinge 224.

FIG. 4C shows the clamp 200 in the closed configuration. In this configuration, clamp 200 can connect the adapter 1 to the tower 112 in the same manner as that shown in FIG. 4A with respect to clamp 2. Opposing portion 220 is rotated about hinge 224 to abut engaging portion 222 (including holes 229) with the shaft of the tower 112 positioned in the opening. An edge of hasp 226 engages with notch 234. Latch 228 is rotated about latch hinge 230 to abut a side of opposing portion 220. Rotation of the latch 228 about the latch hinge 230 pulls hasp 226 against notch 234, thereby pulling opposing portion 220 toward engaging portion 222. The positions of hinges 224, 230, and 232 are selected so that latch 228 forms an over-center engagement to hold clamp 200 in the closed arrangement shown in FIG. 4C to fix the adapter 1 to the tower 112.

Clamp 200 allows the adapter 1 to be connected with the tower 112 without the need for tools. This arrangement also allows the device to be easily removed from the tower 112 by moving latch 228 away from opposing portion 220. Thus, a driver that uses multiple vehicles can conveniently remove the adapter 1 from one vehicle and install it in another.

Figure 3B:
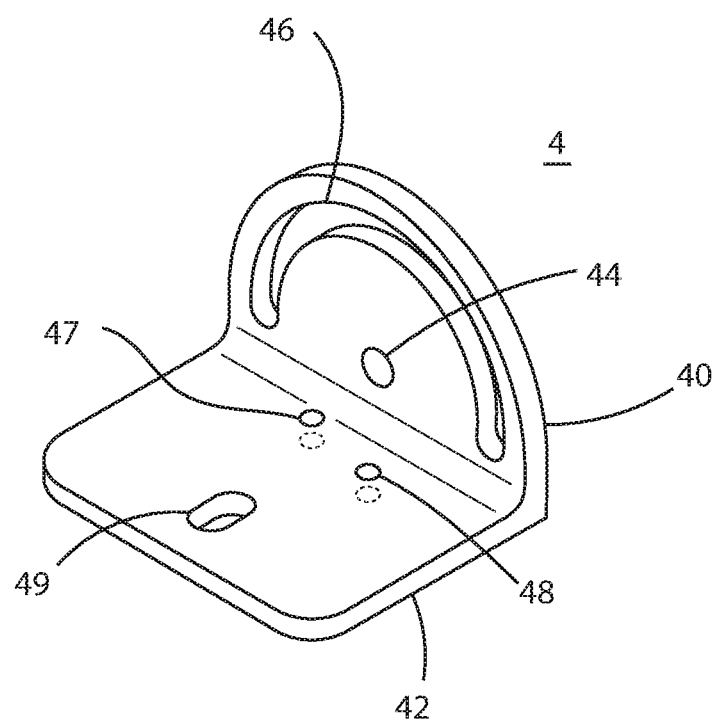
FIG. 3B shows a bracket of the embodiment shown in FIG. 2.

Bracket 4 is shown in FIG. 3B. According to one embodiment of the invention, bracket 4 has a clamp engaging portion 40 arranged perpendicularly with a handle engaging portion 42. The clamp engaging portion has a through hole 44 and an arcuate slot 46. The handle engaging portion 42 has two threaded holes 47, 48 and a slotted hole 49. Bracket 3b is connected with the engagement portion 22 of clamp 2 by bolts extending through hole 44 and through slot 46 and into threaded holes 28 on the engagement portion 22. Arcuate slot 46 allows the bracket 4 to be positioned at a selected angle about the extension axis 10 (as shown in FIG. 2) so that, when the device is fully assembled, the handle 6 is in a position that is comfortable for the driver.

Figure 3C:
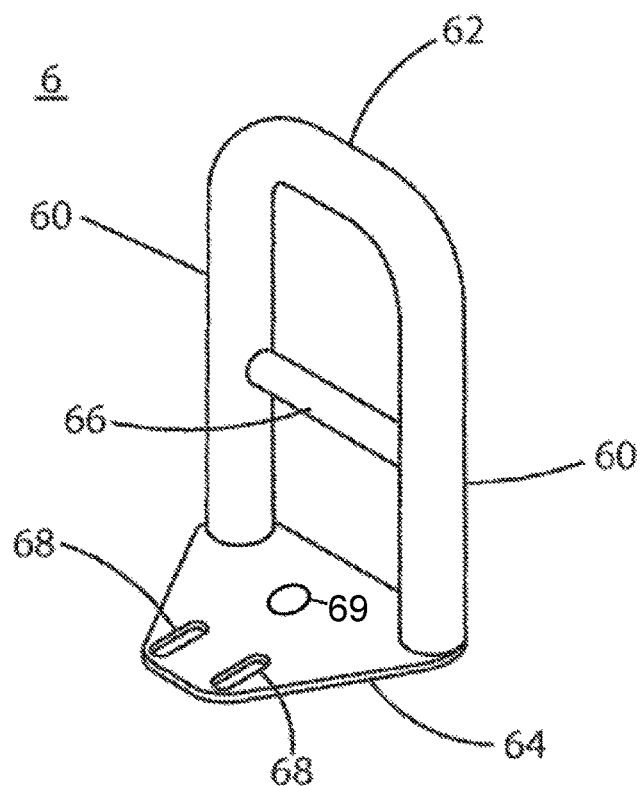
FIG. 3C shows a handle of the embodiment shown in FIG. 2

FIG. 3C shows a detailed view of a handle 6 according to an embodiment of the invention. The handle 6 has side grips 60 connected by top grip 62. Side grips 60 are connected with plate 64. When the device is assembled bolts extend through holes 68 and engage with holes 47 and 49 or with holes 48 and 49. Because holes 68 are slotted, because hole 49 is slotted, and because holes 68 can engage one or the other of holes 47 and 48, handle 6 can be positioned at a selected angular position about handle axis 12 (as shown in FIG. 2). A through hole 69 is located in the plate 64, and aligns with slot 49 when assembled.

Safety bar 66 extends between side grips 60 of handle 6. The safety bar 66 prevents the driver from inadvertently extending his hand through the handle 6. This minimizes the risk that the driver's hand is lodged inside the handle 6, which would create a dangerous situation when driving.

Figure 5:
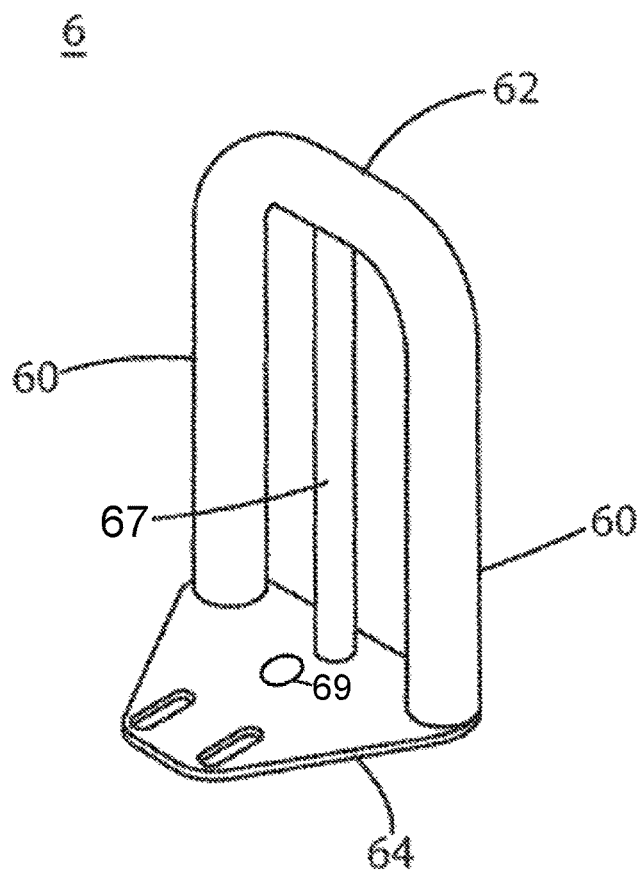
FIG. 5 shows a handle according to a further embodiment of the present invention.

FIG. 5 shows an alternative embodiment of the invention. Here safety bar 67 extends from top grip 62 to plate 64. Again, safety bar 67 partially blocks the opening of handle 6, thereby reducing the risk that the driver can become entangled with the handle 6 while driving.

As illustrated in FIG. 2, in operation the device 1 is positioned on tower 112 so that handle 6 is positioned near the top of tower 112 with bracket 4 extending generally toward the driver. In this configuration, handle 6 is displaced from tower 112 toward the driver, thus reducing the maximum distance the driver must extend his or her arm to reach the farthest gear selection. This feature reduced the stress on the driver's shoulder and upper back muscles. It also allows the driver to more easily reach this gear setting without having to move out of the seat.

As discussed above, the clamp 2, bracket 4 and handle 6 can be positioned at selected angles of tower axis 8, extension axis 10, and handle axis 12 so that the location of the side grips 60 and top grip 62 can be comfortably grasped by the driver. The driver has the option to grasp the handle on any of the side or top grips 60, 62 allowing the driver change the range of motion of his or her wrist, elbow, and shoulder and reduce the impact of repeated gear shifting motions.

Figure 6:
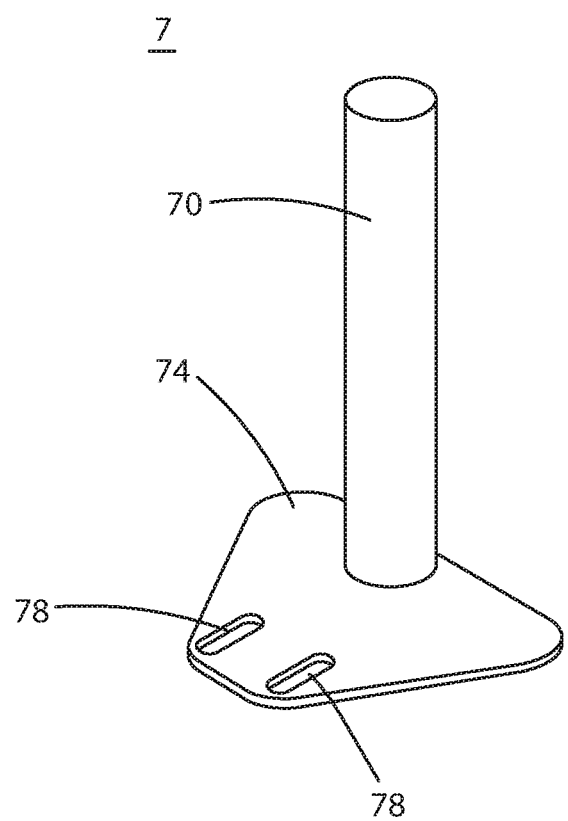
FIG. 6 shows a handle according to yet another embodiment of the present invention.

FIG. 6 shows another alternative configuration of the handle according to another embodiment of the invention. According to this embodiment, handle 7 has a cylindrical grip 70. The grip 70 extends from plate 74. Slotted holes 78 are formed in plate 74. Handle 7 can be affixed to bracket 4 in the same manner as handle 6, as discussed above.

Figure 7:
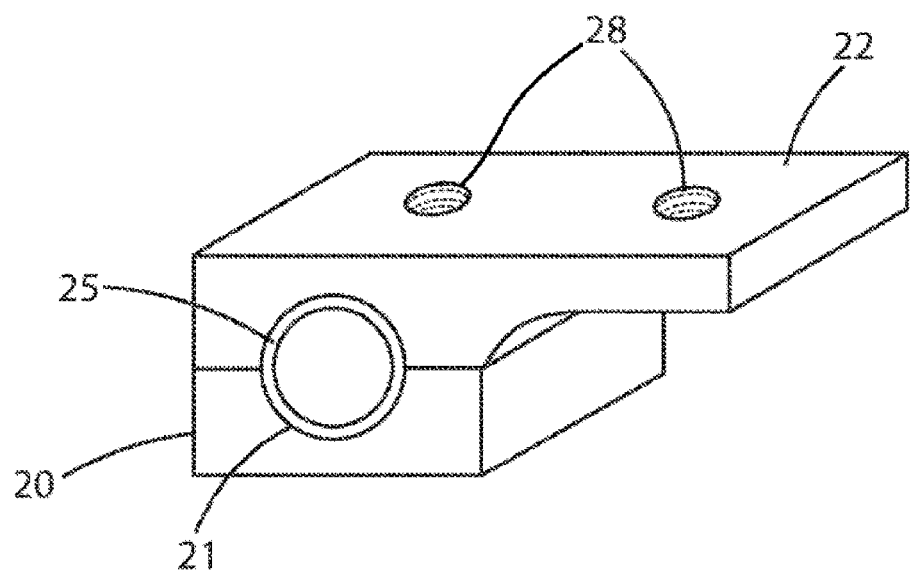
FIG. 7 shows a clamp including a bushing according to a further embodiment of the present invention.

FIG. 7 shows an alternative configuration of the clamp 22 according to a further embodiment of the invention. Positioned within the arcuate surfaces 21 of the opposing portion 20 and engaging portion 22 is bushing 25. The thickness of bushing 25 is selected so that the device 1 can be affixed to towers 112 of differing diameter. Bushing 25 can also be shaped to conform to the shape of a tower that is not cylindrical.

Components of the device 1 can be constructed from materials that have adequate mechanical strength to communicate forces from the driver's hand to the tower 112 to operate the vehicle transmission. These materials include metals and metal alloys, polymers, composite materials, for example, carbon fiber composites, and combinations thereof.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

I claim:
1. An ergonomic adapter, comprising:
a first bracket removably coupleable to a lever of a lever assembly and configured to be selectably positioned along a height of the lever and at a rotational position about an axis of the lever;
an extension bracket rotatably coupleable with the first bracket about an extension axis and configured to be selectably fixed to the first bracket at an angular position about the extension axis, wherein the angular position of the extension bracket is adjustable relative to the axis of the lever; and
a handle coupleable to the extension bracket about a handle axis, the handle comprising two parallel gripping surfaces and a bar member disposed between the parallel portions, each gripping surface being sized to accommodate the operator's hand.

2. The adapter of claim 1, the handle further comprising:
a mounting plate mechanically coupled to at least one of the two parallel gripping surfaces, and the gripping surfaces and the mounting plate forming a loop.

3. The adapter of claim 1, further comprising a bushing disposed between an interior surface of the first bracket and an exterior surface of the lever.

4. The adapter of claim 3, wherein the exterior surface of the lever is cylindrical.

5. The adapter of claim 1, wherein the adapter is formed from a material selected from the group comprising: metals, metal alloys, polymers, composite materials, and combinations thereof.

6. The adapter of claim 1, first bracket comprising: (1) an engagement portion configured to be disposed on a first side of the lever; the engagement portion mechanically coupled to the extension bracket; and (2) an opposing portion configured to be disposed on a second side of the lever opposite the first side.

7. The adapter of claim 6, further comprising a fastener configured to releasably connect the engagement portion to the opposing portion such that, in use, the opposing portion moves toward the engagement portion.

8. The adapter of claim 7, wherein the fastener comprises a hasp and a receiving notch configured to receive the hasp.

9. An ergonomic adapter, comprising:
a first bracket removably coupleable to a lever of a lever assembly and configured to be selectably positioned along a height of the lever and at a rotational position about an axis of the lever;
an extension bracket rotatably coupleable with the first bracket about an extension axis and configured to be selectably fixed to the first bracket at an angular position about the extension axis; and
a handle coupleable to the extension bracket about a handle axis, the handle comprising: (1) two parallel gripping surfaces; each gripping surface being sized to accommodate an operator's hand, (2) a mounting plate mechanically coupleable to at least a first gripping surface of the gripping surfaces, the gripping surfaces and the mounting plate substantially forming a loop, and (3) a bar member extending from a second gripping surface of the gripping surfaces to the mounting plate.

10. An ergonomic adapter for a lever assembly, the adapter comprising:
a first bracket removably coupleable to a lever,
the first bracket including an engagement portion configured to be disposed on a first side of the lever and an opposing portion configured to be disposed on a second side of the lever opposite the first side, the engagement portion having two holes for receiving fasteners, the holes positioned a first distance from one another,
the opposing portion and the engagement portion being mechanically coupleable to one another by a fastener of the fasteners, the fastener configured to cause the opposing portion to move toward the engagement portion and to apply a clamping force to connect the first bracket to the lever at a selected position along a height of the lever and at a rotationally selected position about an axis of the lever;
an extension bracket rotatably coupled with the engagement portion of the first bracket about an extension axis,
the extension bracket comprising a first planar portion and a second planar portion, the first planar portion and the second planar portion connected perpendicular to one another along respective edges thereof,
the first planar portion comprising: (1) a through-hole configured to receive a fastener; and (2) an arcuate slot, the arcuate slot disposed at a constant radial distance from the through-hole, the radial distance being substantially equal to the first distance,
the extension bracket being mechanically coupled to the first bracket by: (1) a first extension fastener extending through the through-hole and engaging one of the holes of the first bracket; and (2) a second extension fastener extending through the arcuate slot and engaging the other of the holes of the first bracket at a selected angular position along the arcuate slot such that the extension bracket is connected with the first bracket at a selected angular position about the extension axis, and
the second planar portion comprising two extension holes for receiving respective handle fasteners; and
a handle coupled to the second planar portion of the extension bracket, the handle comprising a mounting portion and a gripping portion,
the mounting portion comprising two handle mounting slots, the slots disposed such that the handle fasteners inserted therethrough engage with the extension holes,
a position of the handle with respect to the extension bracket being selectable by a position of the handle fasteners in the slots,
the gripping portion comprising: (1) two parallel portions, the parallel portions connected to the mounting portion at one end and connected with one another at their opposite ends by a cross piece; and (2) a bar member extending between the parallel portions intermediate the mounting portion and the cross piece.

* * * * *